(No Model.)
H. F. COX.
CONDUIT FOR WIRES.
No. 328,012. Patented Oct. 13, 1885.
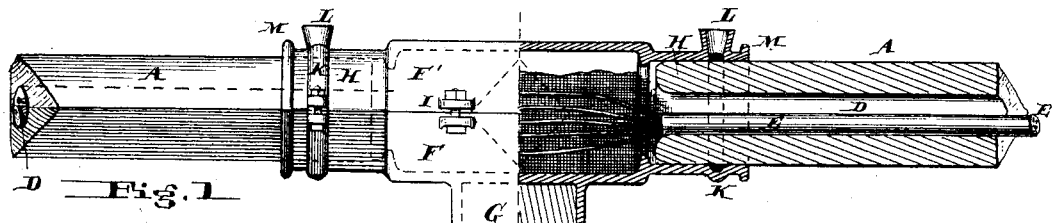
Fig. 1
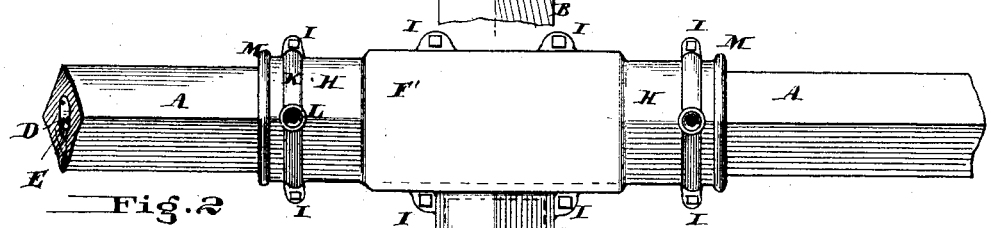
Fig. 2
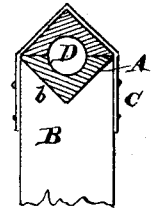
Fig. 5
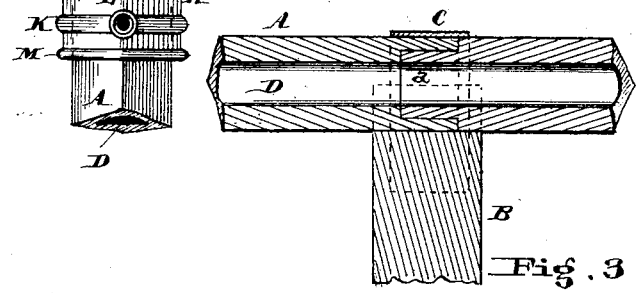
Fig. 3
Fig. 6
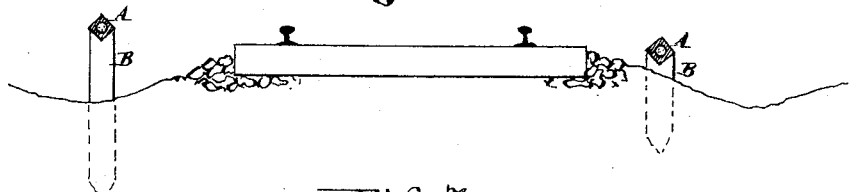
Fig. 7
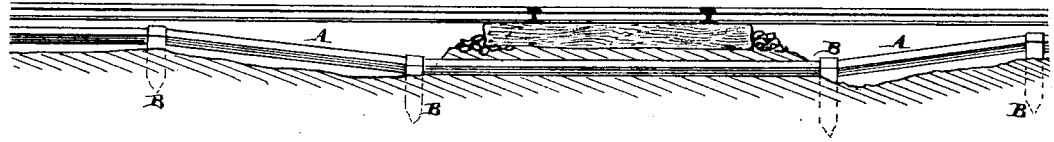
Fig. 4
Attest
Joshua Matlack
J. W. Douglass
Inventor
Henry F. Cox
by his attorneys
Francis T. Chambers

United States Patent Office.

HENRY F. COX, OF PHILADELPHIA, PENNSYLVANIA.

CONDUIT FOR WIRES.

SPECIFICATION forming part of Letters Patent No. 328,012, dated October 13, 1885.

Application filed May 25, 1885. Serial No. 166,610. (No model.)

*To all whom it may concern:*

Be it known that I, HENRY F. COX, of the city of Philadelphia and State of Pennsylvania, have invented a new and useful Improvement in Conduits for Telegraph and Telephone Wires, of which the following is a full and true description, reference being had to the accompanying drawings, which form a part of this specification.

The object of my invention is to provide conduits for telegraph and telephone wires which may be cheaply and speedily constructed, and which, while they will afford ample protection to the wires, will also permit joints and connections to be made without endangering their insulation.

My invention has especial reference to lines of wires along railways, and while in general I prefer that my conduits should run above the surface of the ground, they are well adapted to underground use as well.

Reference being now had to the drawings which illustrate my invention, Figure 1 is a vertical view of my conduit, showing the sectional box for splicing the wires and leading out branch lines. Fig. 2 is a plan view of the conduit and sectional box shown in Fig. 1. Fig. 3 is a sectional view of one of my supporting-posts and of the ends of two conduit-sections supported on it. Fig. 4 is a similar view to Fig. 3, but shows another form of joint for the conduit-sections. Fig. 5 is a cross-section of my conduit and a supporting-post. Fig. 6 is a cross-section of a railway, showing my conduits running along the sides. Fig. 7 shows my conduit running under a railway.

A A represent wooden pipes, preferably square in section, and with a hole, D, bored longitudinally through them, though where it is desired to introduce new wires from time to time the conduit may be made in two longitudinal sections, as shown in Fig. 4.

B B are wooden stakes, which should have pointed ends, and are driven or placed firmly into the ground at uniform distances apart. The upper ends of the stakes B are allowed to project above the ground, and should be carefully aligned to the line of the conduit A, which rests on the tops of the stakes, the joints of the sections being supported directly on and over the top of a stake. Where solid pipe-sections are used a socket-joint—such as *a*, Fig. 3—should be used, and where the pipe-sections are divided longitudinally a broken joint, *a'*, Fig. 4, will be found best adapted for use. The tops of the stakes B should be cut so as to conform to and fit the pipe-section which they support, as is shown at *b*, Fig. 5. By this means the pipe-sections are forced to register correctly with each other.

The wooden sections A are secured to the tops of the posts B by means of a metal band, C, which passes over the top of the conduit, and is secured to the post on each side. This metallic band C is made wide enough to cover the joints *a* or *a'*, and some red lead or other packing impervious to water should be placed between the conduit-sections and the clamp C, so that the joint shall be substantially water-tight.

As will be seen, by this means of securing the conduit-sections A to the stakes B and to each other the strains which would be caused by a more rigid fastening are avoided, and the conduit may contract and expand without injury to the structure. The square section of the conduits enables them to be set in an angular cut in the top of the supporting-stakes, and thus brings them into line with each other and leaves one of their angular edges uppermost, which is desirable, as affording a good water-shed and making it difficult to use the conduit as a foot-walk.

E E are insulated wires or cables which are carried in the conduits A.

At intervals in the line of my conduit, and whenever it is desired to lead out branch lines or to splice the wires, I provide sectional boxes F F', Figs. 1 and 2. These boxes are preferably made of cast-iron, and are provided with a socket, G, which fits over the top of one of the stakes B. As many sockets H are provided as there are lines of conduits leading from the sectional box; and channels or grooves K connected with a hole, L, may be provided, so that when the pipe-section A is introduced into the socket H tar or some water-proof cement may be poured into the hole L and run into and fill the groove K, thus making the joint water-tight. The upper part of the box F' is secured to the lower part, F, by bolts I, or in any usual way, care being taken to render the joint water-tight. I fill the box F with broken glass or mineral wool or other good non-conducting material in a loose fragmentary condition, and spread the wires E apart in said box, separating them from each other by the glass in the box. These boxes F are provided, as I have before stated, in all places where splices or connections are to be made with the insulated wires, which are in them, insulated by the glass packing, and consequently can have their own insulating-covering broken or impaired, as is frequently the case where splices are made, without injury to the insulation of the lines as a whole. Labels may be secured to the wires passing through the boxes F, so that attachments may be made by the line-men without error.

It is of course evident that metallic sockets can be used on the ends of the posts B to hold the ends and protect the joints of the conduit-sections A; but the simple metallic strap with a water-proof packing will, I believe, be found in most cases to be efficient, and it is of course the cheapest device that can be employed.

Having now described my invention, what I claim as new, and desire to secure by Letters Patent, is—

1. As a conduit for insulated telegraph and telephone wires, wooden pipes supported at each end on stakes, and secured to said stakes by a metallic band passing over and protecting the joints, substantially as described.

2. As a conduit for insulated telegraph and telephone wires, wooden pipes supported at each end on stakes, and secured to said stakes and to each other by a metallic band passing over and protecting the joints, substantially as described.

3. As a conduit for insulated telegraph and telephone wires, square wooden pipes set with one edge upward, supported at each end on stakes, and secured to said stakes by a metallic band passing over and protecting the joints, substantially as described.

4. As a conduit for insulated telegraph and telephone wires, wooden pipes supported at each end on stakes, and secured to said stakes by a metallic band passing over and protecting the joints, in combination with metallic sectional boxes filled with loose insulating material, and situated in the conduit-line, substantially as described.

5. As a conduit for insulated telegraph and telephone wires, wooden pipes supported at each end on stakes, and secured to said stakes by a metallic band passing over and protecting the joints, in combination with metallic sectional boxes filled with loose insulating material, and supported on stakes situated in the conduit-line, substantially as described.

6. As a conduit for insulated telegraph and telephone wires, wooden pipes supported at each end on stakes, and secured to said stakes by a metallic band passing over and protecting the joints, in combination with metallic sectional boxes having as many sockets H as there are conduits leading from it, substantially as described.

HENRY F. COX.

Witnesses:
W. O. DUNBAR,
JOSHUA MATLACK.